United States Patent
Hu

(10) Patent No.: US 12,052,454 B2
(45) Date of Patent: Jul. 30, 2024

(54) DATA PROCESSING METHOD, APPARATUS, AND DEVICE FOR POINT CLOUD MEDIA, AND STORAGE MEDIUM

(71) Applicant: Tencent Technology (Shenzhen) Company Limited, Shenzhen (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 37 days.

(21) Appl. No.: 17/960,806

(22) Filed: Oct. 5, 2022

(65) Prior Publication Data
US 2023/0046971 A1 Feb. 16, 2023

Related U.S. Application Data

(63) Continuation of application No. PCT/CN2021/131101, filed on Nov. 17, 2021.

(30) Foreign Application Priority Data

Nov. 26, 2020 (CN) .................. 202011347612.X

(51) Int. Cl.
*H04N 7/16* (2011.01)
*H04N 21/234* (2011.01)
(Continued)

(52) U.S. Cl.
CPC ....... *H04N 21/24* (2013.01); *H04N 21/23418* (2013.01); *H04N 21/2343* (2013.01)

(58) Field of Classification Search
CPC ............. H04N 21/24; H04N 21/23418; H04N 21/2343; H04N 21/85406; H04N 19/37;
(Continued)

(56) References Cited

U.S. PATENT DOCUMENTS

| | | |
|---|---|---|
| 2020/0014953 A1 | 1/2020 | Mammou et al. |
| 2020/0217937 A1 | 7/2020 | Mammou et al. |

(Continued)

FOREIGN PATENT DOCUMENTS

| | | |
|---|---|---|
| CN | 110971906 A | 4/2020 |
| CN | 111133365 A | 5/2020 |

(Continued)

OTHER PUBLICATIONS

Tencent Technology, ISR, PCT/CN2021/131101, Feb. 10, 2022, 2 pgs.

(Continued)

*Primary Examiner* — Annan Q Shang
(74) *Attorney, Agent, or Firm* — Morgan, Lewis & Bockius LLP

(57) ABSTRACT

Embodiments of this application provide a data processing method, apparatus, and device for point cloud media, and a storage medium. The method includes: acquiring information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$; and parsing the $i^{th}$ attribute component based on the information of the $i^{th}$ attribute component. The method relates to the field of point cloud media technologies, and can improve parsing processing efficiency for point cloud media to a certain extent by indicating a mandatory and a priority of an attribute component of the point cloud media.

18 Claims, 6 Drawing Sheets

(51) Int. Cl.
  *H04N 21/2343* (2011.01)
  *H04N 21/24* (2011.01)
(58) Field of Classification Search
  CPC .. H04N 19/42; H04N 21/816; H04N 21/2335;
       H04N 21/234309; H04N 21/4398; H04N
       21/440218
  See application file for complete search history.

(56) References Cited

U.S. PATENT DOCUMENTS

| | | | |
|---|---|---|---|
| 2020/0267369 A1 | 8/2020 | Nagasawa et al. | |
| 2021/0099754 A1* | 4/2021 | Yip | H04N 21/816 |
| 2021/0120347 A1* | 4/2021 | Burns | H04R 25/604 |
| 2021/0211637 A1* | 7/2021 | Wang | G06T 3/005 |
| 2021/0211723 A1* | 7/2021 | Wang | H04N 23/698 |
| 2021/0235058 A1* | 7/2021 | Yip | H04N 13/194 |
| 2021/0281879 A1* | 9/2021 | Roimela | G06T 9/001 |
| 2022/0114763 A1* | 4/2022 | Ray | H04N 21/84 |
| 2024/0080404 A1* | 3/2024 | Okuno | G06F 3/1222 |

FOREIGN PATENT DOCUMENTS

| | | |
|---|---|---|
| WO | WO 2020141259 A2 | 7/2020 |
| WO | WO 2020185578 A1 | 9/2020 |

OTHER PUBLICATIONS

Tencent Technology, WO, PCT/CN2021/131101, Feb. 10, 2022, 4 pgs.
Tencent Technology, IPRP, PCT/CN2021/131101, May 30, 2023, 5 pgs.

* cited by examiner

Sample

| Parameter set Type-length-value byte stream format (if exists) | Geometry Type-length-value byte stream format | Attribute Type-length-value byte stream format |

FIG. 2B

Sample

| Parameter set Type-length-value byte stream format (if exists) | Geometry Type-length-value byte stream format |

FIG. 2C

DATA PROCESSING METHOD, APPARATUS, AND DEVICE FOR POINT CLOUD MEDIA, AND STORAGE MEDIUM

CROSS-REFERENCE TO RELATED APPLICATIONS

This application is a continuation application of PCT Patent Application No. PCT/CN2021/131101, entitled "DATA PROCESSING METHOD, APPARATUS AND DEVICE FOR POINT CLOUD MEDIA, AND STORAGE MEDIUM" filed on Nov. 17, 2021, which claims priority to Chinese Patent Application No. 202011347612.X, filed with the State Intellectual Property Office of the People's Republic of China on Nov. 26, 2020, and entitled "DATA PROCESSING METHOD, APPARATUS, AND DEVICE FOR POINT CLOUD MEDIA, AND STORAGE MEDIUM", all of which are incorporated herein by reference in their entirety.

FIELD OF THE TECHNOLOGY

Embodiments of this application relate to the field of computer vision technologies, and in particular, to the field of point cloud media processing technologies.

BACKGROUND OF THE DISCLOSURE

With the continuous development of science and technology, a large amount of high-precision point cloud data can already be obtained currently with relatively low costs and in a relatively short period of time. The point cloud data is often transmitted between a content production device and a content consumption device in the form of point cloud media.

The transmission process of the point cloud media is specifically as follows: after encoding the point cloud media, the content production device encapsulates the encoded point cloud media to obtain an encapsulation file of the point cloud media, and then transmits the encapsulation file of the point cloud media to the content consumption device; and the content consumption device decapsulates the encapsulation file of the point cloud media transmitted by the content production device, then performs decoding, and finally presents the media file. Due to the relatively large amount of point cloud data included in the point cloud media, the parsing efficiency of the point cloud media is usually relatively low. Therefore, how to improve the parsing efficiency of the point cloud media to provide better experience to consumers of the point cloud media is an issue that has always been concerned about in the industry.

SUMMARY

Embodiments of this application provide a data processing method, apparatus, and device for point cloud media, and a storage medium, which improves parsing processing efficiency for point cloud media to a certain extent by indicating a mandatory or priority of an attribute component of the point cloud media.

According to an aspect, an embodiment of this application provides a method for processing (e.g., decoding) point cloud media, performed by a content consumption device, the method including:

acquiring information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$; and parsing the $i^{th}$ attribute component of the point cloud media based on the information of the $i^{th}$ attribute component.

According to another aspect, an embodiment of this application provides a method for processing (e.g., encoding) point cloud media, performed by a content production device, the method including:

generating information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$; and transmitting the information of the $i^{th}$ attribute component to a content consumption device, for the content consumption device to parse the $i^{th}$ attribute component of the point cloud media based on the information of the $i^{th}$ attribute component.

According to another aspect, an embodiment of this application provides an apparatus for processing point cloud media, including:

an acquisition unit, configured to acquire information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$; and a parsing unit, configured to parse the $i^{th}$ attribute component of the point cloud media based on the information of the $i^{th}$ attribute component.

According to another aspect, an embodiment of this application provides an apparatus for processing point cloud media, including:

a processing unit, configured to generate information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$; and a transmission unit, configured to transmit the information of the $i^{th}$ attribute component to a content consumption device, for the content consumption device to parse the $i^{th}$ attribute component based on the information of the $i^{th}$ attribute component.

According to another aspect, an embodiment of this application provides a device for processing point cloud media, including:

a processor, suitable to implement computer instructions; and a computer-readable storage medium, storing computer instructions, the computer instructions being suitable to be loaded by a processor to perform the method for processing point cloud media described above.

According to another aspect, an embodiment of this application provides a computer-readable storage medium, storing computer instructions, the computer instructions, when being read and executed by a processor of a computer device, causing the computer device to perform the method for processing point cloud media described above.

According to another aspect, an embodiment of this application provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the method for processing point cloud media described above.

In the embodiments of this application, information of each attribute component of point cloud media can be used for instructing a parsing process of the corresponding attribute component, for example, a transmission or parsing process, and the transmission performance or parsing performance can be correspondingly improved. For example, in a transmission link, some attribute components may be strategically discarded according to network conditions and at least one of a mandatory and a priority of each attribute component; in another example, in a decoding link, an encapsulation file from which a mandatory attribute component is missing may be directly discarded by performing verification on integrity of the file based on a mandatory of an attribute component, to avoid wasting decoding resources; in another example, in a decoding link, a decoding sequence of different attribute components may be decided according to at least one of mandatories and priorities of attribute components, for important information to be first rendered and presented; and in another example, in a decoding link, decoding of a specified attribute component may be strategically skipped according to the device decoding capability and at least one of a mandatory and a priority of each attribute component.

BRIEF DESCRIPTION OF THE DRAWINGS

FIG. 2B is a schematic structural diagram of a sample according to an embodiment of this application.

FIG. 2C is a schematic structural diagram of another sample according to an embodiment of this application.

DESCRIPTION OF EMBODIMENTS

Figure 1:
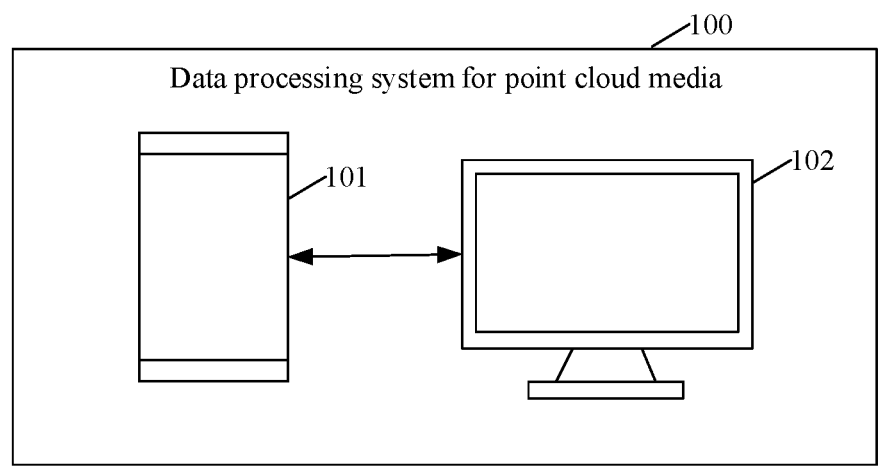
FIG. 1 is a schematic block diagram of a data processing system for point cloud media according to an embodiment of this application.

The concepts related to a point cloud are explained below.

A point cloud is a set of discrete points that are randomly distributed in space and used for expressing the spatial structure and surface attributes of a three-dimensional (3D) object or 3D scene.

Point cloud data is a specific recording form of the point cloud. The point cloud data of each point in the point cloud may include geometric information and attribute information. The geometric information of each point in the point cloud may be Cartesian 3D coordinate data of the point. The attribute information of each point in the point cloud may include, but not limited to, at least one of the following: color information, material information, and laser reflectance information. The color information may be information in any color space. For example, the color information can be red green blue (RGB) information. In another example, the color information may alternatively be YcbCr (YUV) information, where Y represents luma, Cb (U) represents a blue color difference, Cr (V) represents red, and U and V represent chroma, the chroma being used for describing color difference information.

Each point in the point cloud usually has the same amount of attribute information. For example, each point in the point cloud has two types of attribute information: color information and laser reflectance information. In another example, each point in the point cloud has three types of attribute information: color information, material information, and laser reflectance information. During encapsulation of point cloud media, the geometric information of points may also be referred to as geometric components of the point cloud media, and the attribute information of the points may also be referred to as attribute components of the point cloud media. The point cloud media may include one geometric component and one or more attribute components.

Based on application scenarios, point clouds may be divided into two categories, namely, machine perception point clouds and human eye perception point clouds. Application scenarios of machine perception point clouds include, but not limited to: autonomous navigation systems, real-time inspection systems, geographic information systems, visual sorting robots, emergency rescue robots, and other scenarios. Application scenarios of human eye perception point clouds include, but not limited to: digital cultural heritage, free viewpoint broadcasting, 3D immersive communication, 3D immersive interaction, and other scenarios.

The acquisition methods of a point cloud include, but not limited to: computer generation, 3D laser scanning, 3D photogrammetry, and the like. Computers can generate point clouds of virtual 3D objects and scenes. Point clouds of 3D objects or scenes in the static real world can be obtained through 3D laser scanning, and millions of point clouds can be obtained per second. Point clouds of 3D objects or scenes in the dynamic real world can be obtained through 3D photogrammetry, and tens of millions of point clouds can be obtained per second. Specifically, a point cloud on the surface of an object can be acquired by an acquisition device such as a photoelectric radar, a lidar, a laser scanner, or a multi-view camera. A point cloud data obtained according to a laser measurement principle may include 3D coordinate information of points and a laser reflectance of the points. A point cloud obtained according to a photogrammetry principle may include 3D coordinate information of points and color information of the points. A point cloud obtained with reference to the laser measurement principle and the photogrammetry principle may include 3D coordinate information of points, a laser reflectance of the points, and color information of the points. Correspondingly, point clouds may also be divided into three types based on the acquisition methods of the point clouds, namely, first static point clouds, second-type dynamic point clouds, and third-type dynamically acquired point clouds. For the first static point cloud, the object is stationary, and the device for acquiring the point cloud is also stationary; for the second-type dynamic point cloud, the object is moving, but the device for acquiring the point cloud is stationary; and for the third-type dynamically acquired point cloud, the device for acquiring the point cloud is moving.

For example, in the medical field, point clouds of biological tissues and organs can be obtained through magnetic resonance imaging (MRI), computed tomography (CT), and electromagnetic positioning information. These technologies reduce the costs and time period of point cloud acquisition and improve the accuracy of data. The change in the acquisition manners of point clouds makes it possible to acquire a large quantity of point clouds. With the continuous accumulation of large-scale point clouds, efficient storage, transmission, publishing, sharing, and standardization of the point clouds have become the key to point cloud applications.

Point cloud data may be used for forming point cloud media, which may be a media file. The point cloud media may include a plurality of media frames, and each media frame in the point cloud media includes point cloud data. The point cloud media can express the spatial structure and surface attributes of a 3D object or 3D scene flexibly and conveniently, and therefore is widely used. The point cloud media is encoded, then an encapsulation file may be formed by encapsulating an encoded bitstream, and further, the encapsulation file may be transmitted to a user-oriented point cloud media player side. Correspondingly, on the point cloud media player side, the encapsulation file needs to be decapsulated first, then decoded, and finally a decoded data stream is presented. The encapsulation file may also be referred to as a point cloud file.

Up to the present, point clouds can be encoded through a point cloud encoding framework.

The point cloud encoding framework may be the geometry point cloud compression (G-PCC) codec framework or the video point cloud compression (V-PCC) framework provided by the moving picture experts group (MPEG), or may be the AVS-PCC codec framework provided by the audio video standard (AVS). The G-PCC codec framework may be used for compressing the first static point clouds and the third-type dynamically acquired point clouds, and the V-PCC codec framework may be used for compressing the second-type dynamic point clouds. The G-PCC codec framework is also referred to as a point cloud codec TMC13, and the V-PCC codec framework is also referred to as a point cloud codec TMC2.

The following describes the data processing solution for point cloud media provided in the embodiments of this application.

FIG. 1 is a schematic architectural diagram of a data processing system for point cloud media 100 according to an embodiment of this application.

As shown in FIG. 1, the data processing system for point cloud media 100 includes a content consumption device 101 and a content production device 102. The content production device 102 is a computer device used by a provider of point cloud media (for example, a content producer of the point cloud media), and the computer device may be a device capable of encoding and encapsulating point cloud media, such as a personal computer (PC), a smart mobile device (for example, a smartphone), a server, or a mobile platform (such as an unmanned aerial vehicle (UAV) or a robot). The content consumption device 101 is a computer device used by a user (for example, a consumer) of point cloud media, and the computer device may be a device capable of decapsulating and decoding point cloud media, such as a PC, a smart mobile device, or a virtual reality (VR) device (such as a VR headset or VR glasses).

The content production device 102 and the content consumption device 101 may be directly or indirectly connected in a wired communication or wireless communication manner. This is not limited in this embodiment of this application.

Figure 2A:
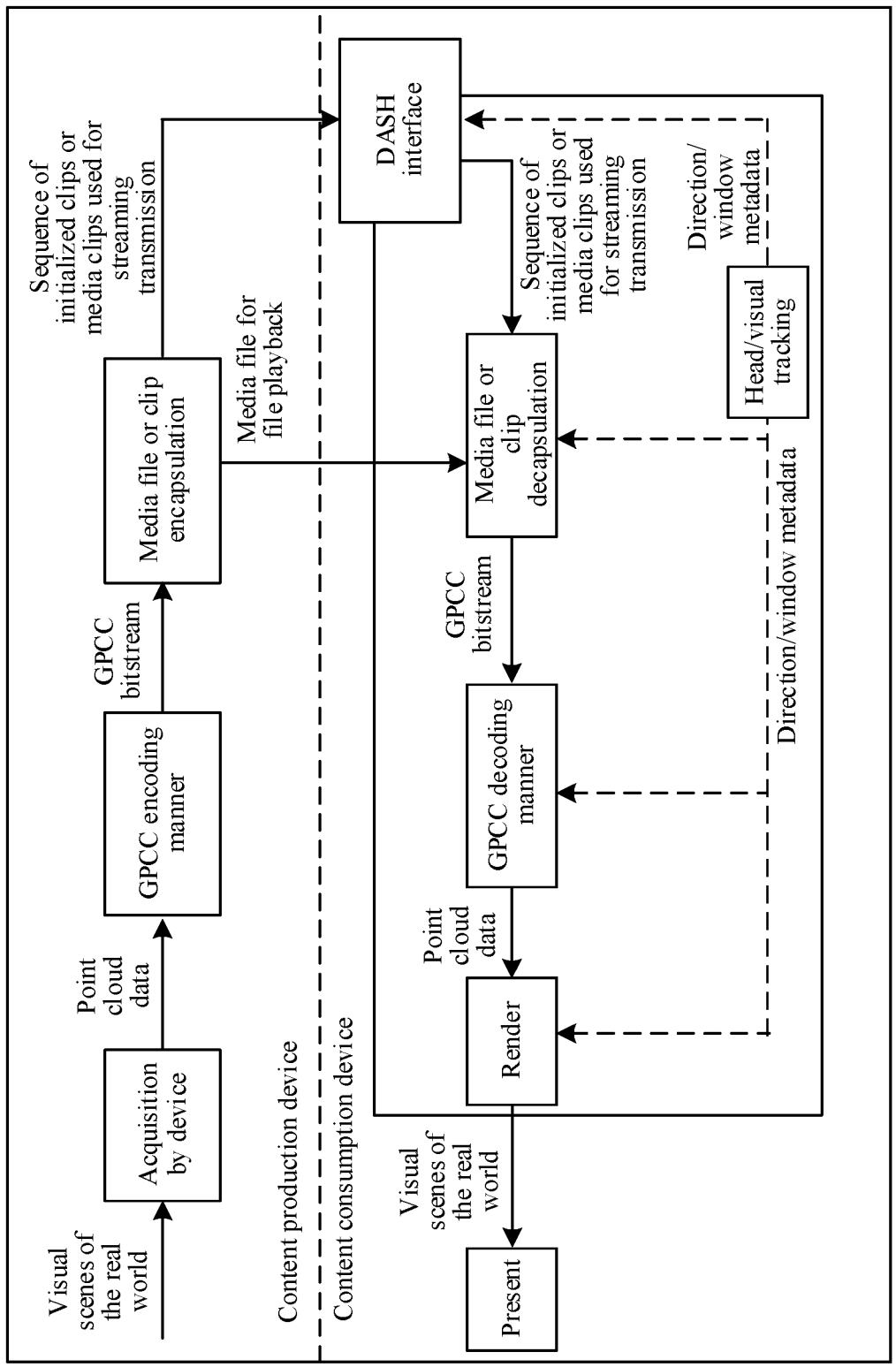
FIG. 2A is a schematic diagram of a data processing architecture for point cloud media according to an embodiment of this application.

FIG. 2A is a schematic architectural diagram of a data processing architecture for point cloud media according to an embodiment of this application. The data processing solution for point cloud media provided in the embodiments of this application is introduced below with reference to the data processing system for point cloud media shown in FIG. 1 and the data processing architecture for point cloud media shown in FIG. 2A.

As shown in FIG. 2A, the data processing process of point cloud media includes the data processing process on the content production device side and the data processing process on the content consumption device side. The specific processing process is as follows:

1. The data processing process on the content production device side:

(1) The acquisition process of point cloud data.

In an implementation, the acquisition manners of point cloud data may be divided into two manners: acquiring visual scenes of the real world through a capture device, and generation through a computer device. In an implementation, the capture device may be a hardware component set in the content production device. For example, the capture device is a camera, or sensor of a terminal. The capture device may alternatively be a hardware apparatus connected to the content production device, for example, a camera connected to a server. The capture device is configured to provide a point cloud data acquisition service for the content production device. The capture device may include, but not limited to, any one of the following: a camera device, a sensor device, and a scanning device, where the camera device may include a common camera, a stereo camera, a light field camera, and the like; the sensing device may include a laser device, a radar device, and the like; and the scanning device may include a 3D laser scanning device, and the like. There may be a plurality of capture devices. These capture devices are deployed in some specific locations in the real space to simultaneously capture point cloud data from different angles in the space, and the captured point cloud data is synchronized both temporally and spatially. In another implementation, the computer device may generate point cloud data according to virtual 3D objects and virtual 3D scenes. Due to the different acquisition manners of point cloud data, compression encoding manners corresponding to point cloud data acquired by using different manners may also be different.

(2) The encoding and encapsulation process of point cloud data.

In an implementation, the content production device may encode the acquired point cloud data in the geometry-based point cloud compression (GPCC) encoding manner or the conventional video-based point cloud compression (VPCC) encoding manner, to obtain a GPCC bitstream or VPCC bitstream of the point cloud data. The GPCC encoding manner is used as an example. The content production device uses a file track to encapsulate the GPCC bitstream of the encoded point cloud data; the file track refers to an encapsulation container of the GPCC bitstream of the encoded point cloud data; the encapsulation container is a standard for mixing and encapsulating the multimedia content (videos, audios, subtitles, chapter information, and the like) generated by the encoder. The encapsulation container can make the synchronized playback of different multimedia contents very simple. The GPCC bitstream may be encapsulated in a single file track, or the GPCC bitstream may be encapsulated into a plurality of file tracks to form an encapsulation file. Specific cases in which the GPCC bitstream is encapsulated in a single file track and the GPCC bitstream is encapsulated in a plurality of file tracks are as follows:

1. The GPCC bitstream is encapsulated in a single file track.

When the GPCC bitstream is transmitted in a single file track, the GPCC bitstream is required to be declared and represented according to the transmission rules of the single file track. The GPCC bitstream encapsulated in a single file track requires no further processing and can be encapsulated in the international organization for standardization base media file format (ISOBMFF). Specifically, each sample encapsulated in a single file track includes one or more GPCC components, and the sample is a set of encapsulated structures of one or more point clouds, for example, the type-length-value byte stream format (TLV) encapsulation structure. A sample is an encapsulation unit in the encapsulation process of the point cloud media. The point cloud media includes a plurality of samples, and one sample is usually one media frame of the point cloud media. The video media is used as an example, and one sample of the video media is one video frame.

FIG. 2B is a schematic structural diagram of a sample according to an embodiment of this application.

As shown in FIG. 2B, during single file track transmission, the sample in the file track includes a GPCC parameter set TLV, a geometry bitstream TLV, and an attribute bitstream TLV, and the sample is encapsulated into the single file track.

2. The GPCC bitstream is encapsulated in a plurality of file tracks.

When the encoded GPCC geometry bitstream and the encoded GPCC attribute bitstream are transmitted in different file tracks, each sample in the file track includes at least one TLV encapsulation structure. The TLV encapsulation structure carries data of a single GPCC component, and the TLV encapsulation structure does not include both the encoded GPCC geometry bitstream and the encoded GPCC attribute bitstream.

It is assumed that there are a file track 1 and a file track 2, a sample 1 transmitted in file track 1 may include the encoded GPCC geometry bitstream but not the encoded GPCC attribute bitstream; a sample 2 transmitted in file track 2 may include the encoded GPCC attribute bitstream but not the encoded GPCC geometry bitstream. Because the content consumption device shall first decode the encoded GPCC geometry bitstream during decoding, the decoding of the encoded GPCC attribute bitstream depends on the decoded geometric information. Therefore, by encapsulating different GPCC component bitstreams in separate file tracks, the content consumption device can first access a file track carrying the encoded GPCC geometry bitstream before decoding the GPCC attribute bitstream.

FIG. 2C is a schematic structural diagram of another sample according to an embodiment of this application.

As shown in FIG. 2C, during transmission of a plurality of file tracks, the encoded GPCC geometry bitstream and the encoded GPCC attribute bitstream are transmitted in different file tracks. The sample in the file track includes a GPCC parameter set TLV and a geometry bitstream TLV, and the sample includes no attribute bitstream TLV. The sample is encapsulated in any one of the plurality of file tracks.

In an implementation, the acquired point cloud data is encoded and encapsulated by the content production device to form an encapsulation file of the point cloud media, and the encapsulation file of the point cloud media may be an entire media file or a media clip in the media file. In addition, the content production device needs to use media presentation description information to record metadata of the encapsulation file of the point cloud media according to file format requirements of the point cloud media, for example, use a media presentation description (MPD) file to record the metadata of the encapsulation file of the point cloud media. The metadata herein is a collective name of the information related to the presentation of point cloud media, and the metadata may include description information of media contents, description information of a window, signaling information related to the media content presentation, and the like. The content production device delivers the MPD file to the content consumption device, so that the content consumption device requests, according to relevant description information in the MDP file, to acquire the encapsulation file of the point cloud media. Specifically, the encapsulation file of the point cloud media may be delivered by the content production device to the content consumption device based on a transmission mechanism. For example, the transmission mechanism may be dynamic adaptive streaming over HTTP (DASH) or smart media transport (SMT).

The content production device encapsulates the compressed point cloud data into a series of small media clips based on a hypertext transfer protocol (HTTP). Time included in each media clip may be set, and the included time is generally relatively short. However, each media clip has a plurality of bit rate versions, so that the network adaptive download can be implemented more accurately. The content consumption device adaptively chooses to download and play the highest bit rate version that can be carried by the current network according to the current network conditions, thereby not only ensuring the quality of the current media, but also avoiding a playback freeze caused by an excessively high bit rate or a rebuffer event. Based on this, real-time network conditions can be dynamically and seamlessly adapted to and high-quality played contents can be provided with fewer freezes, which greatly improves user experience. In other words, the bit rate switching uses a media clip as a unit. When the network bandwidth is relatively good, the content consumption device may request a media clip with a relatively high bit rate in the corresponding time; and when the network bandwidth becomes poor, the content consumption device downloads a media clip with a relatively low bit rate in the corresponding time. Because media clips of different qualities are aligned with each other in time, the picture is natural and smooth during switching between media clips of different qualities.

The encapsulation file can be accurately described through the MPD file. The MPD file may be an extensive markup language (XML) file, and completely describes all the information of the encapsulation file, including various audio and video parameters, durations of media clips, bit rates and resolutions of different media clips, the corresponding uniform resource locator (URL), and the like. By downloading and parsing the MPD file, the content consumption device can acquire a media clip that best matches its own performance and bandwidth. The MPD file may include one or more adaptation sets. For example, one adaptation set includes a plurality of video clips of the same video content with different bit rates, and another adaptation set includes a plurality of audio clips of the same audio content with different bit rates. One adaptation set may include a plurality of representations. One representation may include a combination of one or more media contents. For example, a video file of a certain resolution may be seen as one representation.

The content consumption device transmits, according to the URL of the MPD file, a request to the server to acquire the MPD file. The content consumption device first parses the MPD file, to obtain content information of the encapsulation file, including media configuration information such as a video resolution, a video content type, segmentation conditions, a frame rate, a code rate, and a URL address of each media clip. By analyzing the content information of the encapsulation file, the content consumption device selects an appropriate media clip according to factors such as the current network state and the size of the client buffer. Subsequently, the content consumption device transmits a request to the content production device, and downloads the corresponding media clip according to the media URL for streaming transmission. After receiving the corresponding encapsulation file, the content consumption device decapsulates the encapsulation file to obtain a bare bitstream, and finally sends the bare bitstream to a decoder for decoding and playback.

2. Data processing process on the content consumption device side:
(1) The decapsulation and decoding process of the point cloud data.

In an implementation, the content consumption device may acquire the encapsulation file of the point cloud media through the MDP file delivered by the content production device. The file decapsulation process of the content consumption device is opposite to the file encapsulation process of the content production device. The content consumption device decapsulates the encapsulation file of the point cloud media according to the file format requirements of the point cloud media, to obtain an encoded bitstream, namely, a GPCC bitstream or a VPCC bitstream. The decoding process of the content consumption device is opposite to the encoding process of the content production device. The content consumption device decodes the encoded bitstream, to restore the point cloud data.

In an implementation, the content consumption device renders the point cloud data obtained by decoding the GPCC bitstream according to the metadata related to rendering and the window in the MDP file. After rendering, presentation of the visual scene corresponding to the point cloud data is implemented.

In this embodiment of this application, the content production device first samples visual scenes of the real world through an acquisition device, to obtain point cloud data corresponding to the visual scenes of the real world, then encodes the acquired point cloud data in a GPCC encoding manner or a VPCC encoding manner, to obtain a GPCC bitstream or a VPCC bitstream, where both the GPCC bitstream and the VPCC bitstream may include the encoded geometry bitstream and the encoded attribute bitstream; and subsequently encapsulates the GPCC bitstream or VPCC bitstream to obtain an encapsulation file of the point cloud media, that is, a media file or media clip. The content production device may further encapsulate the metadata into the media file or media clip, and then deliver the encapsulation file of the point cloud media to the content consumption device through a transmission mechanism, for example, deliver the encapsulation file of the point cloud media to the content consumption device through a DASH mechanism.

The content consumption device first receives the encapsulation file of the point cloud media transmitted by the content production device; then decapsulates the encapsulation file of the point cloud media to obtain the encoded GPCC bitstream or VPCC bitstream and metadata; subsequently parses the metadata in the encoded GPCC bitstream or VPCC bitstream, that is, decodes the encoded GPCC bitstream or VPCC bitstream, to obtain point cloud data; and finally renders the decoded point cloud data based on the viewing (window) direction of the current user, and displays the point cloud data in the content consumption device.

The viewing (window) direction of the current user is determined by the head tracking and visual tracking functions. In addition to rendering the point cloud data in the current user's viewing (window) direction through a renderer, an audio in the current user's viewing (window) direction may further be decoded and optimized through an audio decoder. The content production device encodes and encapsulates the acquired point cloud data, thereby realizing the storage and transmission of the point cloud data; the content production device delivers the encapsulation file of the point cloud media obtained through encapsulation to the content consumption device, thereby realizing releasing and sharing of the point cloud data; and the content consumption device decapsulates, decodes and consumes the encapsulation file of the point cloud media, for the visual scenes of the real world to be presented in the content consumption device.

It may be understood that the data processing system for point cloud media described in this embodiment of this application is intended to more clearly describe the technical solutions in the embodiments of this application, and do not constitute a limitation on the technical solutions provided in the embodiments of this application. A person of ordinary skill in the art may learn that, with evolution of the system architecture and appearance of a new service scenario, the technical solutions provided in the embodiments of this application are also applicable to a similar technical problem or scenario.

It can be seen from the foregoing data processing process of point cloud media that the content production device needs to encode the point cloud media and encapsulate it into an encapsulation file of the point cloud media before delivering it to the content consumption device. Correspondingly, the content consumption device needs to decapsulate and decode the encapsulation file of the point cloud media before rendering and presenting the point cloud media. The data processing system for point cloud media provided in this embodiment of this application supports a data box, such as an ISOBMFF data box. The data box is a data block including metadata or an object including metadata. That is, the data box includes metadata of the point cloud media. The point cloud media may be associated with a plurality of data boxes. For example, the point cloud media includes a component information data box (GPCC Component Info Box), which may be used for describing the information of the components of the point cloud media, and the component information data box may be used for decoding the encoded GPCC bitstream or VPCC bitstream.

This embodiment of this application provides an example of the syntax of a component information data box, and for details, reference may be made to the following Table 1:

TABLE 1

```
aligned(8) class GPCCComponentInfoBox
extends FullBox('ginf', version=0, 0) {
    unsigned int(8)         gpcc_type;
    if(gpcc_type = 4) {
        unsigned int(1)     attr_type_available;
        bit(4) reserved = 0;
        unsigned int(8)     attr_index;
        utf8string          attr_name;
        if (attr_type_available) {
            unsigned int(3) attr_type;
        } else {
            bit(3) reserved = 0;
        }
    }
}
```

The semantics of the syntax involved in Table 1 are as follows:

1. Gpcc_type field:

The gpcc_type field indicates the component type of the GPCC bitstream. For example, if a value of the gpcc_type field is 2, it means that the components of the GPCC bitstream are geometric components; if the value of the gpcc_type field is 4, it means that the components of the GPCC bitstream are attribute components; and the value of the gpcc_type field may alternatively be set to other retention values. Because the point cloud media can be encapsulated to form an encapsulation file, the component type of the GPCC bitstream may also be understood as the component type of the encapsulation file, that is, the component type of the media file or media clip.

2. Attribute index (attr_index) field:

The attr_index field indicates a position of an attribute component in a sequence parameter set (SPS). The SPS includes information parameters required for initializing the decoder. For example, the SPS may include parameters for a continuous encoded video sequence, such as an SPS identifier, a quantity of frames, a quantity of reference frames, a decoded image size, and a frame field encoding mode selection identifier. Certainly, the SPS may also include other specific parameters, and this is not specifically limited in this embodiment of this application.

3. Attribute name (attr_name) field:

The attr_name field indicates a name of an attribute component that can be directly interpreted by the user.

4. Attribute type available (attr_type_available) field:

The attr_type_available field indicates whether the attribute type is indicated, or whether the attribute type (attr_type) field is available. For example, if a value of the attr_type_available field is 1, it means that an attribute type is additionally indicated, and if the value of the attr_type_available field is 0, it means that no additional attribute type is indicated.

5. Attr_type field:

The attr_type field indicates the attribute type following the ISO/IEC 23090-9 GPCC encoding standard.

Table 1 is only an example of this application, and shall not be construed as a limitation on this application. For example, in Table 1, the component information data box is expanded to a full data box (FullBox), that is, information such as a version field is added to the component information data box; but in other alternative embodiments, a data box with no expansion may also be used. In addition, the component information data box in Table 1 is a data box applied to the GPCC encapsulation technology, but in other alternative embodiments, the solution of this application may also be applied to the VPCC encapsulation technology.

Based on the component information data box shown in Table 1, information used for indicating a mandatory or priority of an attribute component is added in this embodiment of this application. That is, the fields at the sub-packaging level are expanded. For the semantics of the syntax of the expanded component information data box, reference may be made to Table 2 below:

TABLE 2

```
aligned(8) class GPCCComponentInfoBox
extends FullBox('ginf', version=0, 0) {
    unsigned int(8)         gpcc_type;
    if(gpcc_type = 4) {
        unsigned int(1)     attr_type_available;
        unsigned int(1)     attr_mandatory;
        bit(4) reserved = 0;
        unsigned int(8)     attr_index;
        unsigned int(8)     attr_priority;
        utf8string          attr_name;
        if (attr_type_available) {
            unsigned int(3) attr_type;
        } else {
            bit(3) reserved = 0;
        }
    }
}
```

As shown in Table 2, relative to Table 1, the following two fields are expanded in this embodiment of this application:

6. Attribute mandatory (attr_mandatory) field:

The attr_mandatory field is used for indicating whether an attribute component is a mandatory attribute component or a non-mandatory attribute component. For example, if a value of the attr_mandatory field is 1, it indicates that the attribute component is a mandatory component; if the value of the attr_mandatory field is 0, it indicates that the attribute component is a non-mandatory component. In another example, if a value of the attr_mandatory field is 0, it indicates that the attribute component is a mandatory component; if the value of the attr_mandatory field is 1, it indicates that the attribute component is a non-mandatory component.

7. Attribute priority (attr_priority) field:

The attr_priority field is used for indicating a priority of an attribute component. For example, a smaller value of the attr_priority field indicates a higher priority of the attribute component.

It is to be understood that for the same fields in Table 2 as those in Table 1, reference may be made to the relevant descriptions in Table 1, and to avoid repetition, details are not described herein again.

According to the component information data box of the point cloud media shown in Table 2 in this embodiment of this application, the content production device may configure the attr_mandatory field in the component information data box of the point cloud media according to a mandatory of each attribute component of the point cloud media, and configure the attr_priority field in the component information data box of the point cloud media according to a priority of each attribute component of the point cloud media.

The attr_mandatory field and the attr_priority field of an attribute component in the component information data box can be used for instructing a transmission or parsing process, and the transmission performance or parsing performance can be correspondingly improved. For example, in a transmission link, some attribute components may be strategically discarded according to network conditions and a mandatory and a priority of each attribute component; in another example, in a decoding link, an encapsulation file from which a mandatory attribute component is missing may be directly discarded by performing verification on integrity of the file according to a mandatory of an attribute component, to avoid wasting decoding resources; in another example, in a decoding link, a decoding sequence of different attribute components may be decided according to mandatories and priorities of attribute components, for important information to be first rendered and presented; and in another example, in a decoding link, decoding of a specified attribute component may be strategically skipped according to the device decoding capability and a mandatory and a priority of each attribute component.

Figure 3:
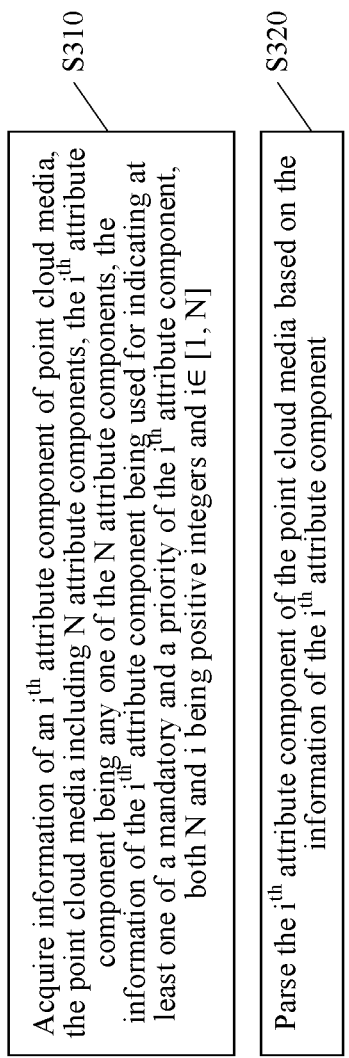
FIG. 3 is a schematic flowchart of a method for processing point cloud media according to an embodiment of this application.

FIG. 3 is a schematic flowchart of a method for processing point cloud media 300 according to an embodiment of this application. The method 300 may be performed by a content consumption device in a point cloud media system.

As shown in FIG. 3, the method 300 may include the following steps:

S310: Acquire information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and i∈[1, N].

S320: Parse the $i^{th}$ attribute component of the point cloud media based on the information of the $i^{th}$ attribute component.

In short, after acquiring the information of the $i^{th}$ attribute component of the point cloud media, the content consumption device parses the $i^{th}$ attribute component based on the information of the $i^{th}$ attribute component. In other words, the content consumption device may acquire the information of each attribute component in the point cloud media, and then parse the point cloud media based on the information of each attribute component in the point cloud media. The information of each attribute component of the point cloud media can be used for instructing a parsing process of the corresponding attribute component, for example, a transmission or parsing process; and correspondingly, by parsing the attribute component based on the information, the transmission performance or parsing performance can be improved.

In an implementation, the content production device may determine the information of each attribute component of the point cloud media according to an application scenario of the point cloud media; and during encapsulation of the point cloud media, the information may be encapsulated or filled in a component information data box, and the encapsulation file of the point cloud media may include the component information data box. In addition, the information may also be transmitted to the content consumption device through a signaling message, so that the content consumption device can request the corresponding encapsulation file according to the information in the signaling message, then obtain a component information data box and a to-be-decompressed bitstream by decapsulating the encapsulation file, and subsequently parse the to-be-encoded bitstream based on the component information data box.

In an implementation, the component information data box of the point cloud media may be an ISO base media file format (ISOBMFF) data box. After acquiring the component information data box of the point cloud media, the content consumption device parses the attribute components corresponding to the point cloud media according to the component information data box, and displays the parsed attribute components in the current window.

In an implementation, the information of the $i^{th}$ attribute component includes an attr_priority field, the attr_priority field being used for indicating the priority of the $i^{th}$ attribute component, a smaller value of the attr_priority field indicating a higher priority of the $i^{th}$ attribute component and a lower possibility that the $i^{th}$ attribute component is discarded during transmission, or a larger value of the attr_priority field indicating a higher priority of the $i^{th}$ attribute component and a lower possibility that the $i^{th}$ attribute component is discarded during transmission; and S320 may include:

parsing the $i^{th}$ attribute component based on the attr_priority field.

In other words, the attr_priority field may be used as a discarding policy or a transmission policy for the $i^{th}$ attribute component. For example, the information of the $i^{th}$ attribute component may be used for instructing a transmitting node whether the $i^{th}$ attribute component can be discarded, or whether the $i^{th}$ attribute component needs to be transmitted first. During transmission, the transmission node may strategically discard some attribute components according to network conditions and the attr_priority field of each attribute component, and then encapsulates the file again for transmission.

In an implementation, the point cloud media includes a plurality of attribute components, and a $j^{th}$ attribute component of the point cloud media is any one of the N attribute components other than the $i^{th}$ attribute component, j being a positive integer and j∈[1, N]; the priority of the $i^{th}$ attribute component is higher than a priority of the $j^{th}$ attribute component; and S320 may include:

first parsing the $i^{th}$ attribute component, and then parsing the $j^{th}$ attribute component; or parsing the $i^{th}$ attribute component, and skipping parsing the $j^{th}$ attribute component.

In other words, the component information data box includes the attr_priority field of each attribute component, and the content consumption device may strategically parse each attribute component of the point cloud media based on the priority of each attribute component of the point cloud media. Specifically, the content consumption device may first parse attribute components of the point cloud media with relatively high priorities and then parse attribute components with relatively low priorities based on the priority of each attribute component of the point cloud media. That is, the priority of each attribute component of the point cloud media can be used for determining a decoding sequence of the attribute components, so that important information can be rendered and presented first. Certainly, the attribute components with relatively low priorities may alternatively be strategically discarded based on the priority of each attribute component when the content consumption device is lacking in capabilities, that is, decoding of the attribute components with relatively low priorities can be skipped, so that the content consumption device can render the point cloud data normally.

In an implementation, the information includes an attribute mandatory (attr_mandatory) field, the attr_mandatory field being used for indicating that the $i^{th}$ attribute component is a mandatory attribute component or a non-mandatory attribute component, the $i^{th}$ attribute component cannot be discarded during transmission when the attr_mandatory field indicates that the $i^{th}$ attribute component is a mandatory attribute component, and the $i^{th}$ attribute component can be discarded during transmission when the attr_mandatory field indicates that the $i^{th}$ attribute component is a non-mandatory attribute component; and S320 may include:

parsing the $i^{th}$ attribute component based on the attr_mandatory field.

In other words, the attr_mandatory field may be used as a discarding policy or a transmission policy for the $i^{th}$ attribute component. For example, the information of the $i^{th}$ attribute component is used for instructing a transmitting node whether the $i^{th}$ attribute component can be discarded, or whether the $i^{th}$ attribute component needs to be transmitted first. During transmission, the transmission node may strategically discard some attribute components according to network conditions and the attr_mandatory field of each attribute component, and then encapsulates the file again for transmission.

In an implementation, S320 may include:

when the attr_mandatory field indicates that the $i^{th}$ attribute component is a mandatory attribute component, first parsing the $i^{th}$ attribute component and then parsing non-mandatory attribute components in the point cloud media; and when the attr_mandatory field indicates that the $i^{th}$ attribute component is a non-mandatory attribute component, first parsing mandatory attribute components in the point cloud media and then parsing the $i^{th}$ attribute component; or when the attr_mandatory field indicates that the $i^{th}$ attribute component is a mandatory attribute component, parsing the $i^{th}$ attribute component; and when the attr_mandatory field indicates that the $i^{th}$ attribute component is a non-mandatory attribute component, skipping parsing the $i^{th}$ attribute component.

In other words, the component information data box includes the attr_mandatory field of each attribute component, and the content consumption device may strategically parse each attribute component of the point cloud media based on the mandatory of each attribute component of the point cloud media. Specifically, the content consumption device may first parse mandatory attribute components of the point cloud media and then parse non-mandatory attribute components based on the mandatory of each attribute component of the point cloud media. That is, the mandatory of each attribute component of the point cloud media can be used for determining a decoding sequence of the attribute components, so that important information can be rendered and presented first. Certainly, the non-mandatory attribute components may alternatively be strategically discarded based on the mandatory of each attribute component when the content consumption device is lacking in capabilities, that is, decoding of the non-mandatory attribute components can be skipped, so that the content consumption device can render the point cloud data normally.

In an implementation, S320 may include:

performing verification on integrity of the point cloud media when the attr_mandatory field indicates that the $i^{th}$ attribute component is a mandatory attribute component; and when the $i^{th}$ attribute component is missing from the point cloud media, discarding the point cloud media or continuing to parse the remaining mandatory attribute components and non-mandatory attribute components in the point cloud media.

In other words, the component information data box includes the attr_mandatory field of each attribute component, and the content consumption device may strategically parse each attribute component of the point cloud media based on the mandatory of each attribute component of the point cloud media. Specifically, the content consumption device may determine whether a mandatory attribute component is missing based on a mandatory of each attribute component of the point cloud media, and when it is determined that a mandatory attribute component is missing, may directly skip decoding of the point cloud media, or may continue to decode the remaining mandatory attribute components and non-mandatory attribute components in the point cloud media.

The attr_mandatory field may be used for performing verification on integrity of the point cloud media and discarding an incomplete point cloud media. However, the attr_mandatory field shall not be limited to a determining condition for determining whether to discard the point cloud media. That is, when some mandatory attribute components are missing from the point cloud media, the content consumption device may choose to discard the point cloud media, or may choose to continue to decode and present the remaining mandatory attribute components and non-mandatory attribute components.

In an implementation, S310 may include:

receiving an MPD file transmitted by a content production device, the MPD file including at least one piece of description information of the point cloud media, the at least one piece of description information including target description information used for describing a target encapsulation file; transmitting an acquisition request to the content production device in response to a selection operation on the target description information, the acquisition request carrying the target description information, to cause the content production device to return the target encapsulation file according to the acquisition request, the target encapsulation file including a component information data box of the point cloud media, the component information data box including the information; and acquiring the information of the $i^{th}$ attribute component from the component information data box.

In short, the content consumption device may select target description information based on the received MPD file, and then request a target encapsulation file based on the target description information, where the target encapsulation file may include the information of each attribute component. In this way, the target encapsulation file may be parsed based on the information of each attribute component.

In an implementation, the MPD file further includes the information of the $i^{th}$ attribute component.

In other words, the MPD file is further expanded to support the DASH mechanism in this application. For example, for details, reference may be made to Table 3 below:

TABLE 3

| Elements and Attributes for GPCC component descriptor | Data type | Description |
|---|---|---|
| Component | GPCC: GPCC component type | The component indicates information of GPCC point cloud components of representation(s) including the component |

TABLE 3-continued

| Elements and Attributes for GPCC component descriptor | Data type | Description |
| --- | --- | --- |
| Component@component_type | xs: string | The component@component_type indicates the type of a point cloud component, 'geom' represents a geometric component, and 'attr' represents an attribute component. |
| Component@attribute_type | xs: unsigned byte | The component@attribute_type indicates the type of an attribute component, and the component@attribute_type only exists when a point cloud component is an attribute. Optionally, different values represent different attribute types. For example, 0 represents a color, 1 represents a reflectivity, 2 represents a frame ID, 3 represents a material ID, 4 represents a transparency, 5 represents a normal vector, 6 . . . 255 represents a reserved value. |
| Component@attr_index | xs: unsigned byte | The component@attr_index indicates a position of an attribute component in a sequence parameter set (SPS). The field only exists when a point cloud component is an attribute. |
| Component@attribute_mandatory | 1 bit | The component@attribute_mandatoy indicates a mandatory of the attribute component. If a value of the component@attribute_mandatory is 1, it indicates that the attribute component is a mandatory component; and if the value of the component@attribute_mandatory is 0, it indicates that the attribute component is a non-mandatory attribute component. The component@attribute_mandatory only exists when a point cloud component is an attribute. |
| Component@attribute_priority | xs: unsigned byte | The component@attribute_priority indicates a priority of the attribute component, where a smaller value of this field indicates a higher priority. The component@attribute_priority only exists when a point cloud component is an attribute. |

As shown in Table 3, the component@attribute_mandatory and the component@attribute_priority are expanded in the MPD file. It is to be understood that for the meaning of the component@attribute_mandatory and the component@attribute_priority, reference may be respectively made to the description related to the attr_mandatory field and the attr_priority field in the foregoing component information data. To avoid repetition, details are not described herein again.

It is to be understood that Table 3 is only an example of this application, and shall not be construed as a limitation on this application. For example, in other alternative embodiments, the MPD file may further include a description for the use of each element or sub-element, and the element or sub-element may also be directly understood as a field or information in the MPD file.

Figure 4:
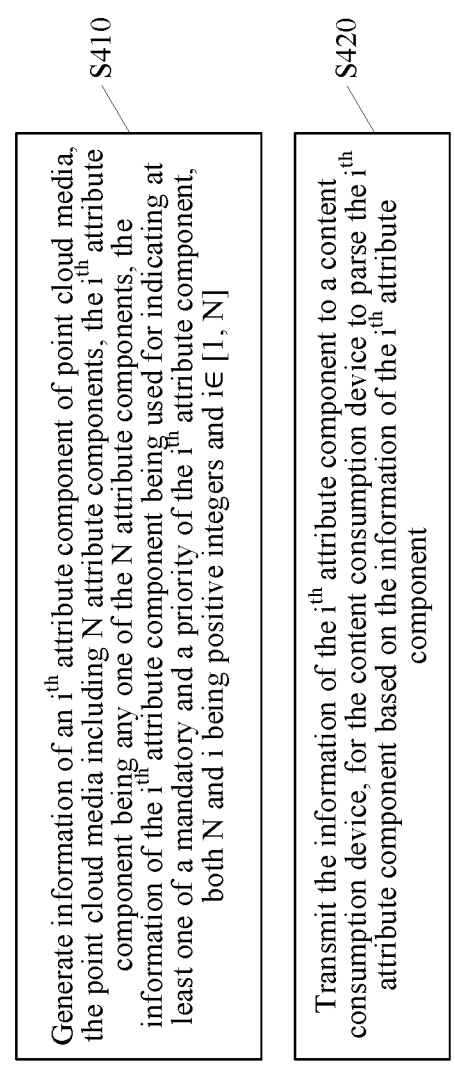
FIG. 4 is another schematic flowchart of a method for processing point cloud media according to an embodiment of this application.

FIG. 4 is a schematic flowchart of a method for processing point cloud media 400 according to an embodiment of this application. The method 400 may be performed by the content production device 102 in the point cloud media system shown in FIG. 1.

As shown in FIG. 4, the method for processing point cloud media 400 includes the following steps:

S410: Generate information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and $i \in [1, N]$.

S420: Transmit the information of the $i^{th}$ attribute component to a content consumption device, for the content consumption device to parse the $i^{th}$ attribute component based on the information of the $i^{th}$ attribute component.

In an implementation, S420 may include:
generating an MPD file, the MPD file including at least one piece of description information of the point cloud media, the at least one piece of description information including target description information used for describing a target encapsulation file; transmitting the MPD file to the content consumption device; receiving an acquisition request transmitted by the content consumption device, the acquisition request carrying the target description information; and transmitting the target encapsulation file to the content consumption device according to the acquisition request, the target encapsulation file including a component information data box of the point cloud media, the component information data box including the information of the $i^{th}$ attribute component.

In an implementation, the MPD file further includes the information of the $i^{th}$ attribute component.

Figure 5:
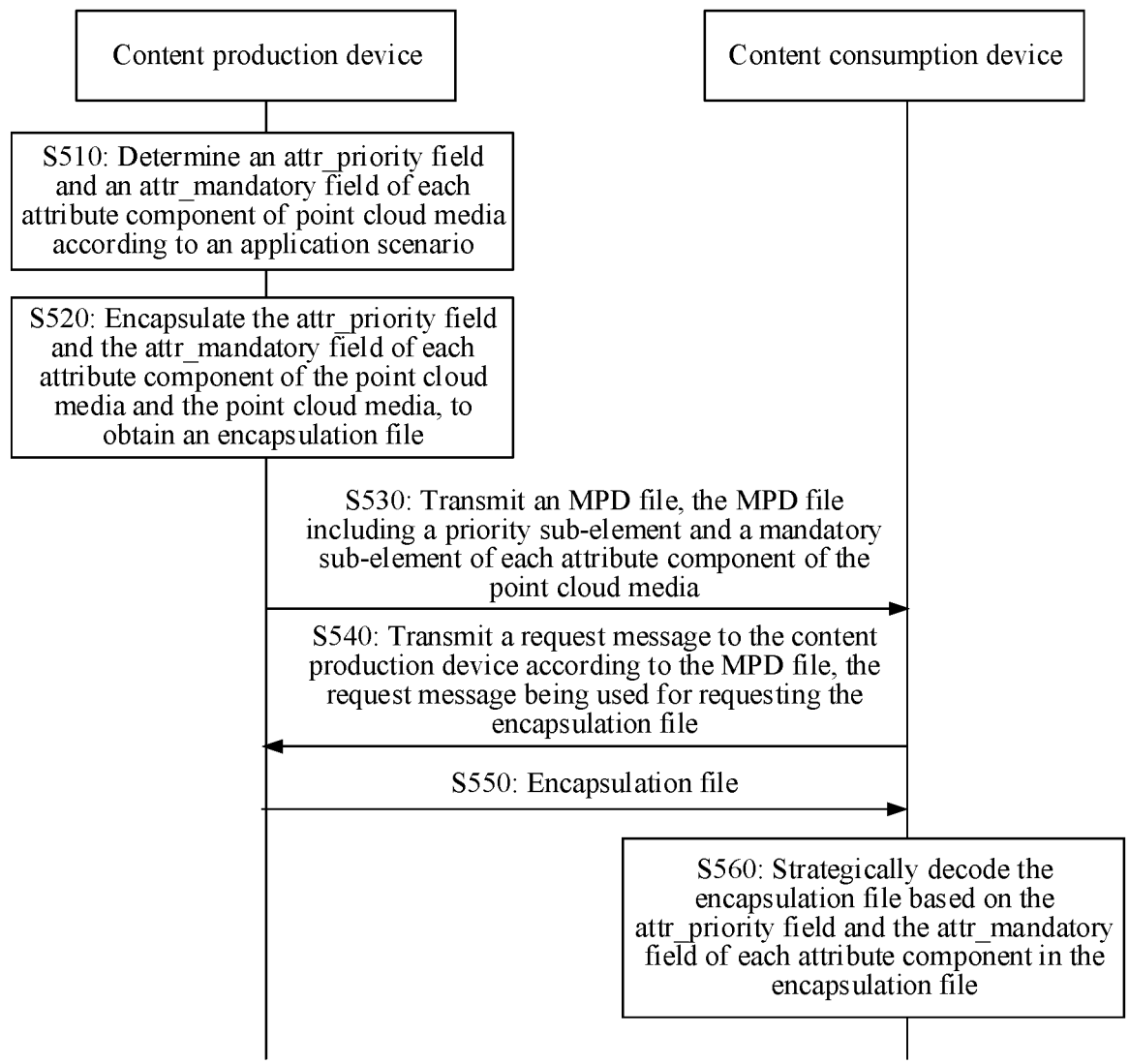
FIG. 5 is still another schematic flowchart of a method for processing point cloud media according to an embodiment of this application.

FIG. 5 is a schematic flowchart of a method for processing point cloud media 500 according to an embodiment of this application. The method 500 may be performed interactively by the content production device 102 and the content consumption device 101 in the point cloud media system shown in FIG. 1.

The following describes the data processing solution for point cloud media provided in the embodiments of this application by using examples with reference to FIG. 5 for a specific application scenario. As shown in FIG. 5, the method for processing point cloud media 500 may include some or all of the following contents:

S510: A content production device determines an attr_priority field and an attr_mandatory field of each attribute component of point cloud media according to an application scenario.

It is assumed that there are three pieces of point cloud media, namely F1, F2, and F3. F1 is a digital museum exhibit with three attribute components: color, material, and reflectivity. Because it is a scene facing the human eyes, color>material>reflectivity in priority. F2 is a robot sorting target with three attribute components: color, material, and reflectivity, where material>color>reflectivity in priority. F3 is a UAV search and rescue target with three attribute components: color, material, and reflectivity. Because special attention needs to be paid to reflective objects and colorful objects in a search and rescue scene, reflectivity=color>material in priority.

S520: The content production device encapsulates the attr_priority field and the attr_mandatory field of each attribute component of the point cloud media and the point cloud media, to obtain an encapsulation file.

The corresponding fields in the encapsulation files F1 to F3 obtained by the content production device according to the application scenario are as follows:

F1:
{attr_mandatory=1; attr_priority=0; attr_name='Colour'};
{attr_mandatory=0; attr_priority=1; attr_name='Material ID'};
{attr_mandatory=0; attr_priority=2; attr_name='Reflectance'}.

F2:
{attr_mandatory=0; attr_priority=1; attr_name='Colour'};
{attr_mandatory=1; attr_priority=0; attr_name='Material ID'};
{attr_mandatory=0; attr_priority=2; attr_name='Reflectance'}.

F3:
{attr_mandatory=1; attr_priority=0; attr_name='Colour'};
{attr_mandatory=0; attr_priority=1; attr_name='Material ID'};
{attr_mandatory=1; attr_priority=0; attr_name='Reflectance'}.

where attr_mandatory represents the attr_mandatory field, attr_priority represents the attr_priority field, and attr_name represents a name of the attribute component S530: The content production device transmits an MPD file to a content consumption device, the MPD file including a priority sub-element and a mandatory sub-element of each attribute component of the point cloud media.

For the encapsulation files F1 to F3, the content production device transmits an MPD file 1 to a content consumption device U1, the MPD file 1 being used for describing the encapsulation file F1; transmits an MPD file 2 to a content consumption device U2, the MPD file 2 being used for describing the encapsulation file F2; and transmits an MPD file 3 to a content consumption device U3, the MPD file 3 being used for describing the encapsulation file F3.

It is to be understood that the value of each sub-element (component@attribute_mandatory and component@attribute_priority) in the MPD file is consistent with a value of the corresponding field in S520. To avoid repetition, details are not described herein again.

S540: The content consumption device transmits a request message to the content production device according to the MPD file, the request message being used for requesting the encapsulation file.

S550: The content consumption device receives the encapsulation file transmitted by the content production device.

The content consumption device U1 requests the encapsulation file F1 based on the MPD file 1; the content consumption device U2 requests the encapsulation file F2 based on the MPD file 2; and the content consumption device U3 requests the encapsulation file F3 based on the MPD file 3.

The encapsulation files F1 to F3 may be transmitted from the content production device to the content consumption devices U1 to U3 through a transmission node. At the transmission node, some attribute components may be strategically discarded according to the network conditions of the corresponding content consumption device. For example, it is assumed that the network conditions of the content consumption device U1 are good, and the transmission node may not discard any attribute components; it is assumed that the network conditions of the content consumption devices U2 and U3 are relatively poor, and the transmission node may discard a reflectivity attribute component of the file F2 and a material attribute component of the file F3 according to the priority of each attribute component in F2 and F3. After discarding the foregoing attribute components, the transmission node encapsulates the files F2 and F3 again and transmits them to the corresponding content consumption devices.

S560: The content consumption device strategically decodes the encapsulation file based on the attr_priority field and the attr_mandatory field of each attribute component in the encapsulation file.

After receiving the encapsulation file F1, the content consumption device U1 decodes the color, material, and reflectivity attribute components in sequence according to the priorities of the three attribute components, and renders and present the three decoded attribute components. After the content consumption device U2 receives the encapsulation file F2, due to the limited decoding capability of the sorting robot, the content consumption device U2 chooses to discard the color attribute and only decode the material component for the robot sorting task. After the content consumption device U3 receives the file F3, due to poor network conditions, part of the data of the color attribute component is missing during transmission, and it can be learned that the color attribute component is a mandatory attribute according to the MPD file. In this case, the content consumption device U3 may choose to directly discard the encapsulation file F3 and re-request the encapsulation file F3; or may choose to decode the remaining reflectivity components that are also mandatory attributes.

Figure 6:
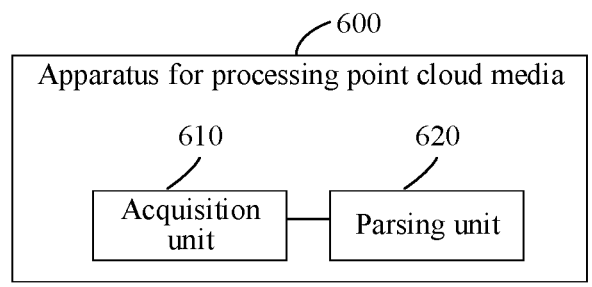
FIG. 6 is a schematic block diagram of an apparatus for processing point cloud media according to an embodiment of this application.

FIG. 6 is a schematic structural diagram of an apparatus for processing point cloud media 600 according to an embodiment of this application. The apparatus for processing point cloud media 600 may be configured to perform corresponding steps in the method for processing point cloud media shown in FIG. 3.

As shown in FIG. 6, the apparatus for processing point cloud media 600 may include:
  an acquisition unit 610, configured to acquire information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and i∈[1, N]; and
  a parsing unit 620, configured to parse the $i^{th}$ attribute component based on the information of the $i^{th}$ attribute component.

In an implementation, the information of the $i^{th}$ attribute component includes an attr_priority field, the attr_priority field being used for indicating the priority of the $i^{th}$ attribute component, a smaller value of the attr_priority field indicating a higher priority of the $i^{th}$ attribute component and a lower possibility that the $i^{th}$ attribute component is discarded during transmission, or a larger value of the attr_priority field indicating a higher priority of the $i^{th}$ attribute component and a lower possibility that the $i^{th}$ attribute component is discarded during transmission; and
  the parsing unit 620 is specifically configured to:
  parse the $i^{th}$ attribute component based on the attr_priority field.

In an implementation, the point cloud media includes a plurality of attribute components, and a $j^{th}$ attribute component of the point cloud media is any one of the N attribute components other than the $i^{th}$ attribute component, j being a positive integer and j∈[1, N]; the priority of the $i^{th}$ attribute component is higher than a priority of the $j^{th}$ attribute component; and
  the parsing unit 620 is specifically configured to:
  first parse the $i^{th}$ attribute component, and then parse the $j^{th}$ attribute component; or parse the $i^{th}$ attribute component, and skip parsing the $j^{th}$ attribute component.

In an implementation, the information of the $i^{th}$ attribute component includes an attribute mandatory (attr_mandatory) field, the attr_mandatory field being used for indicating that the $i^{th}$ attribute component is a mandatory attribute component or a non-mandatory attribute component, the $i^{th}$ attribute component cannot be discarded during transmission when the $i^{th}$ attribute component is a mandatory attribute component, and the $i^{th}$ attribute component can be discarded during transmission when the $i^{th}$ attribute component is a non-mandatory attribute component; and
  the parsing unit 620 is specifically configured to:
  parse the $i^{th}$ attribute component based on the attr_mandatory field.

In an implementation, the parsing unit 620 is specifically configured to:
  when the attr_mandatory field indicates that the $i^{th}$ attribute component is a mandatory attribute component, first parse the $i^{th}$ attribute component and then parse non-mandatory attribute components in the point cloud media; and when the attr_mandatory field indicates that the $i^{th}$ attribute component is a non-mandatory attribute component, first parse mandatory attribute components in the point cloud media and then parse the $i^{th}$ attribute component; or
  when the attr_mandatory field indicates that the $i^{th}$ attribute component is a mandatory attribute component, parse the $i^{th}$ attribute component; and when the attr_mandatory field indicates that the $i^{th}$ attribute component is a non-mandatory attribute component, skip parsing the $i^{th}$ attribute component.

In an implementation, the parsing unit 620 is specifically configured to:
  perform verification on integrity of the point cloud media when the attr_mandatory field indicates that the $i^{th}$ attribute component is a mandatory attribute component; and
  when it is determined through the verification that the $i^{th}$ attribute component is missing from the point cloud media, discard the point cloud media or continue to parse the remaining mandatory attribute components and non-mandatory attribute components in the point cloud media.

In an implementation, the acquisition unit 610 is specifically configured to:
  receive an MPD file transmitted by a content production device, the MPD file including at least one piece of description information of the point cloud media, the at least one piece of description information including target description information used for describing a target encapsulation file;
  transmit an acquisition request to the content production device in response to a selection operation on the target description information, the acquisition request carrying the target description information, to cause the content production device to return the target encapsulation file according to the acquisition request, the target encapsulation file including a component information data box of the point cloud media, the component information data box including the information of the $i^{th}$ attribute component; and
  acquire the information of the $i^{th}$ attribute component from the component information data box.

In an implementation, the MPD file further includes the information of the $i^{th}$ attribute component.

Figure 7:
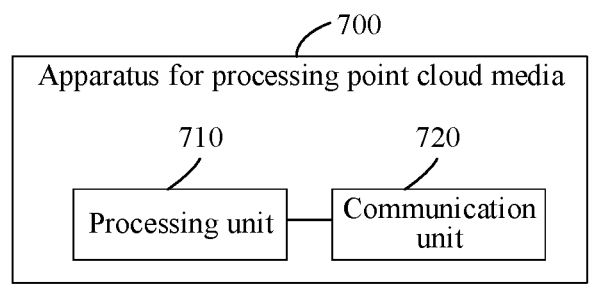
FIG. 7 is another schematic block diagram of an apparatus for processing point cloud media according to an embodiment of this application.

FIG. 7 is a schematic structural diagram of an apparatus for processing point cloud media 700 according to an embodiment of this application. The apparatus for processing point cloud media 700 may be configured to perform corresponding steps in the method for processing point cloud media shown in FIG. 4.

As shown in FIG. 7, the apparatus for processing point cloud media 700 may include:
  a generation unit 710, configured to generate information of an $i^{th}$ attribute component of point cloud media, the point cloud media including N attribute components, the $i^{th}$ attribute component being any one of the N attribute components, the information of the $i^{th}$ attribute component being used for indicating at least one of a mandatory and a priority of the $i^{th}$ attribute component, both N and i being positive integers and i∈[1, N]; and
  a communication unit 720, configured to transmit the information of the $i^{th}$ attribute component to a content consumption device, for the content consumption device to parse the $i^{th}$ attribute component based on the information of the $i^{th}$ attribute component.

In an implementation, the communication unit 720 is specifically configured to:
  generate an MPD file, the MPD file including at least one piece of description information of the point cloud media, the at least one piece of description information including target description information used for describing a target encapsulation file;
  transmit the MPD file to the content consumption device;
  receive an acquisition request transmitted by the content consumption device, the acquisition request carrying the target description information; and transmit the target encapsulation file to the content consumption device according to the acquisition request, the target encapsulation file including a component information data box of the point cloud media, the component information data box including the information of the i$^{th}$ attribute component.

In an implementation, the MPD file further includes the information of the i$^{th}$ attribute component.

It is to be understood that the apparatus embodiments and the method embodiments may correspond to each other, and for similar descriptions, reference may be made to the method embodiments. To avoid repetition, details are not described herein again. Specifically, the apparatus for processing point cloud media 600 may correspond to the corresponding subject for performing the method 300 or 500 in the embodiments of this application, and each unit in the apparatus for processing point cloud media 600 is for implementing the correspond process in the method 300 or 500 respectively. Similarly, the apparatus for processing point cloud media 700 may correspond to the corresponding subject for performing the method 400 or 500 in the embodiments of this application, and each unit in the apparatus for processing point cloud media 700 is for implementing the corresponding process in the method 400 or 500. For brevity, details are not described herein again.

It is to be understood that units of the apparatus for processing point cloud media involved in the embodiments of this application may be separately or wholly combined into one or several other units, or one (or more) of the units herein may further be divided into a plurality of units of smaller functions. In this way, same operations can be implemented, and implementation of the technical effects of the embodiments of this application is not affected. The foregoing units are divided based on logical functions. In an actual application, a function of one unit may also be implemented by a plurality of units, or functions of a plurality of units are implemented by one unit. In other embodiments of this application, the apparatus for processing point cloud media may also include other units. During actual application, the functions may also be cooperatively implemented by other units and may be cooperatively implemented by a plurality of units. According to another embodiment of this application, a computer program (including program code) that can perform the steps in the corresponding method may be run on a general computing device, such as a computer, which includes processing elements and storage elements such as a central processing unit (CPU), a random access memory (RAM), and a read-only memory (ROM), to construct the apparatus for processing point cloud media related in the embodiments of this application and implement the method for processing point cloud media in the embodiments of this application. The computer program may be recorded in, for example, a computer-readable storage medium, and may be loaded into the content consumption device 101 or content production device 102 of the data processing system for point cloud media shown in FIG. 1 by using the computer-readable storage medium, and run in the content consumption device or content production device, to implement the corresponding method in the embodiments of this application.

In other words, the units mentioned above may be implemented in the form of hardware, may be implemented by instructions in the form of software, or may be implemented in the form of a combination of software and hardware. Specifically, the steps of the method embodiments in the embodiments of this application may be completed by a hardware integrated logical circuit in a processor, or by using instructions in a form of software. The steps of the methods disclosed with reference to the embodiments of this application may be directly performed and completed by using a hardware decoding processor, or may be performed and completed by using a combination of hardware and software in the decoding processor. Optionally, the software may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the steps of the foregoing method embodiments in combination with hardware thereof.

Figure 8:
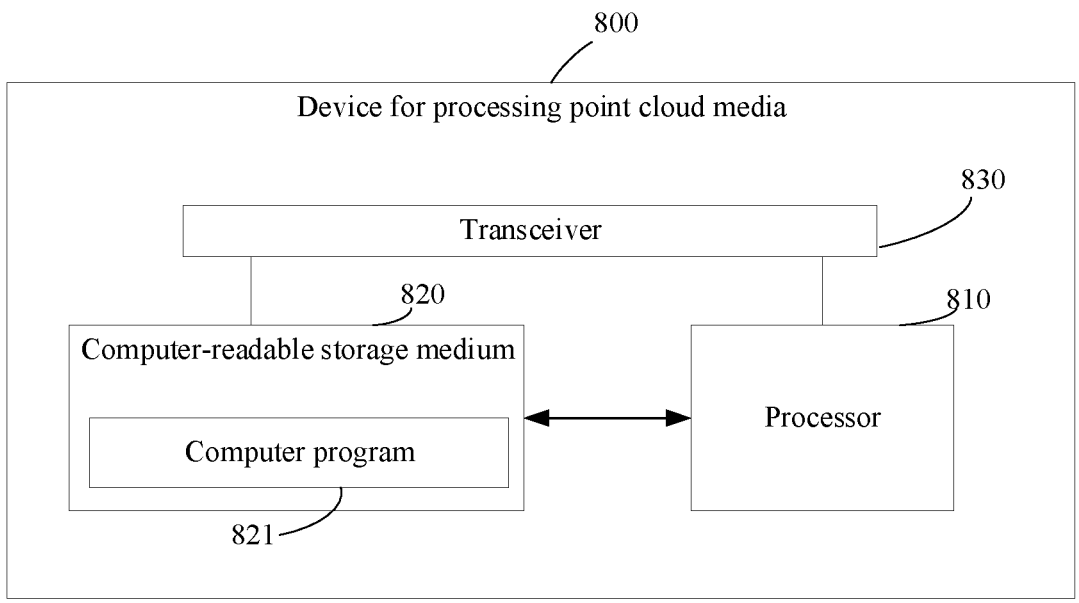
FIG. 8 is a schematic block diagram of a device for processing point cloud media according to an embodiment of this application.

FIG. 8 is a schematic structural diagram of a device for processing point cloud media 800 according to an embodiment of this application.

As shown in FIG. 8, the device for processing point cloud media 800 includes at least a processor 810 and a computer-readable storage medium 820. The processor 810 and the computer-readable storage medium 820 may be connected by a bus or in another manner. The computer-readable storage medium 820 is configured to store a computer program 821. The computer program 821 includes computer instructions. The processor 810 is configured to execute the computer instructions stored in the computer-readable storage medium 820. The processor 810 is a computing core and a control core of the device for processing point cloud media 800, is suitable to implement one or more computer instructions, and is specifically suitable to load and execute the one or more computer instructions to implement a corresponding method procedure or a corresponding function.

For example, the processor 810 may alternatively be referred to as a central processing unit (CPU). The processor 810 may include, but not limited to, a general purpose processor, a digital signal processor (DSP), an application-specific integrated circuit (ASIC), a field-programmable gate array (FPGA) or another programmable logic device, a discrete gate or a transistor logic device, or a discrete hardware component.

For example, the computer-readable storage medium 820 may be a high-speed RAM or a non-volatile memory, for example, at least one magnetic disk memory. Optionally, the computer-readable storage medium may further be at least one computer-readable storage medium located away from the foregoing processor 810. Specifically, the computer-readable storage medium 820 includes, but not limited to, a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct Rambus random access memory (DR RAM).

In an implementation, the device for processing point cloud media 800 may be the content consumption device 101 in the data processing system for point cloud media shown in FIG. 1. The computer-readable storage medium 820 stores first computer instructions; the processor 810 loads and executes the first computer instructions stored in the computer-readable storage medium 820 to implement the corresponding steps in the method embodiment shown in FIG. 3 or FIG. 5. In a specific implementation, the first computer instructions in the computer-readable storage medium 820 are loaded by the processor 810 to perform the corresponding steps. To avoid repetition, details are not described herein again.

In an implementation, the device for processing point cloud media 800 may be the content production device 102 in the data processing system for point cloud media shown in FIG. 1. The computer-readable storage medium 820 stores second computer instructions; the processor 810 loads and executes the second computer instructions stored in the computer-readable storage medium 820 to implement the corresponding steps in the method embodiment shown in FIG. 4 or FIG. 5. In a specific implementation, the second computer instructions in the computer-readable storage medium 820 are loaded by the processor 810 to perform the corresponding steps. To avoid repetition, details are not described herein again.

According to another aspect of this application, an embodiment of this application further provides a computer-readable storage medium, and the computer-readable storage medium is a memory device in a device for processing point cloud media 800 and is configured to store programs and data, for example, a computer-readable storage medium 820. It may be understood that the computer-readable storage medium 820 herein may include an internal storage medium of the device for processing point cloud media 800 and certainly may also include an extended storage medium supported by the device for processing point cloud media 800. The computer-readable storage medium provides storage space, and the storage space stores an operating system of the device for processing point cloud media 800. In addition, the storage space further stores one or more computer instructions suitable to be loaded and executed by the processor 810. The computer instructions may be one or more computer programs 821 (including program code).

According to another aspect of this application, a computer program product or a computer program is provided, the computer program product or the computer program including computer instructions, the computer instructions being stored in a computer-readable storage medium, for example, a computer program 821. In this case, the data processing device 800 may be a computer, the processor 810 reads the computer instructions from the computer-readable storage medium 820, and executes the computer instructions, to cause the computer to perform the method for processing point cloud media provided in the various optional manners described above.

In other words, when software is used to implement the embodiments, the embodiments may be implemented completely or partially in a form of a computer program product. The computer program product includes one or more computer instructions. When the computer program instructions are loaded and executed on the computer, the procedures of the embodiments of this application are all or partially run or functions of the embodiments of this application are all or partially implemented. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. A person of ordinary skill in the art may notice that the exemplary units and procedure steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

The foregoing contents are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for processing point cloud media, performed by a computer device, the method comprising:
receiving a media presentation description (MPD) file transmitted by a second computer device, the MPD file comprising at least one piece of description information of point cloud media, the at least one piece of description information comprising target description information used for describing a target encapsulation file of the point cloud media, the point cloud media comprising N attribute components, and the target description information including (i) an attribute priority (attr_priority) field indicating a priority of an $i^{th}$ attribute component and (ii) an attribute mandatory (attr_mandatory) field indicating that whether the $i^{th}$ attribute component is a mandatory attribute component or not, the $i^{th}$ attribute component being any one of the N attribute components and both N and i being positive integers and i∈[1, N];
transmitting an acquisition request to the second computer device in response to a selection operation on the target description information in accordance with (i) a current network condition and (ii) the attr_priority field and the attr_mandatory field of the $i^{th}$ attribute component, wherein the second computer device is configured to package and return the target encapsulation file according to the acquisition request, the target encapsulation file comprising a component information data box of the point cloud media, the component information data box comprising information of the $i^{th}$ attribute component;

receiving the target encapsulation file from the second computer device; and parsing the $i^{th}$ attribute component of the point cloud media based on the information of the $i^{th}$ attribute component from the target encapsulation file in accordance with (i) the current network condition and (ii) the attr_priority field and the attr_mandatory field of the $i^{th}$ attribute component in the target description information.

2. The method according to claim 1, wherein a smaller value of the attr_priority field indicates a higher priority of the $i^{th}$ attribute component and a lower possibility that the $i^{th}$ attribute component is discarded during transmission, or a larger value of the attr_priority field indicating a higher priority of the $i^{th}$ attribute component and a lower possibility that the $i^{th}$ attribute component is discarded during transmission.

3. The method according to claim 1, wherein the point cloud media comprises a plurality of attribute components, and a $j^{th}$ attribute component of the point cloud media is any one of the N attribute components other than the $i^{th}$ attribute component, j being a positive integer and j∈[1, N]; the priority of the $i^{th}$ attribute component is higher than a priority of the $j^{th}$ attribute component; and the parsing the $i^{th}$ attribute component of the point cloud media from the target encapsulation file comprises:

parsing the $i^{th}$ attribute component of the point cloud media, and skipping the $j^{th}$ attribute component of the point cloud media from the target encapsulation file.

4. The method according to claim 1, wherein the $i^{th}$ attribute component cannot be discarded during transmission when the $i^{th}$ attribute component is a mandatory attribute component, and the $i^{th}$ attribute component can be discarded during transmission when the $i^{th}$ attribute component is a non-mandatory attribute component.

5. The method according to claim 1, wherein the parsing the $i^{th}$ attribute component of the point cloud media from the target encapsulation file comprises:

when the attr_mandatory field indicates that the $i^{th}$ attribute component is a mandatory attribute component, first parsing the $i^{th}$ attribute component of the point cloud media and then parsing non-mandatory attribute components in the point cloud media; and when the attr_mandatory field indicates that the $i^{th}$ attribute component is a non-mandatory attribute component, first parsing mandatory attribute components in the point cloud media and then skipping parsing the $i^{th}$ attribute component.

6. The method according to claim 1, wherein the parsing the $i^{th}$ attribute component from the target encapsulation file comprises:

performing verification on integrity of the point cloud media when the attr_mandatory field indicates that the $i^{th}$ attribute component is a mandatory attribute component; and when it is determined through the verification that the $i^{th}$ attribute component is missing from the point cloud media, discarding the point cloud media or continuing to parse the remaining mandatory attribute components and non-mandatory attribute components in the point cloud media.

7. A computer device for processing point cloud media, comprising:

a processor; and a computer-readable storage medium, storing a computer program, the computer program, when executed by the processor, causing the computer device to implement a method for processing point cloud media including:

receiving a media presentation description (MPD) file transmitted by a second computer device, the MPD file comprising at least one piece of description information of point cloud media, the at least one piece of description information comprising target description information used for describing a target encapsulation file of the point cloud media, the point cloud media comprising N attribute components, and the target description information including (i) an attribute priority (attr_priority) field indicating a priority of an $i^{th}$ attribute component and (ii) an attribute mandatory (attr_mandatory) field indicating that whether the $i^{th}$ attribute component is a mandatory attribute component or not, the $i^{th}$ attribute component being any one of the N attribute components and both N and i being positive integers and i∈[1, N];

transmitting an acquisition request to the second computer device in response to a selection operation on the target description information in accordance with (i) a current network condition and (ii) the attr_priority field and the attr_mandatory field of the $i^{th}$ attribute component, wherein the second computer device is configured to package and return the target encapsulation file according to the acquisition request, the target encapsulation file comprising a component information data box of the point cloud media, the component information data box comprising information of the $i^{th}$ attribute component;

receiving the target encapsulation file from the second computer device; and parsing the $i^{th}$ attribute component of the point cloud media based on the information of the $i^{th}$ attribute component from the target encapsulation file in accordance with (i) the current network condition and (ii) the attr_priority field and the attr_mandatory field of the $i^{th}$ attribute component in the target description information.

8. The computer device according to claim 7, wherein the point cloud media comprises a plurality of attribute components, and a $j^{th}$ attribute component of the point cloud media is any one of the N attribute components other than the $i^{th}$ attribute component, j being a positive integer and j∈[1, N]; the priority of the $i^{th}$ attribute component is higher than a priority of the $j^{th}$ attribute component; and the parsing the $i^{th}$ attribute component of the point cloud media from the target encapsulation file comprises:

parsing the $i^{th}$ attribute component of the point cloud media, and skipping the $j^{th}$ attribute component of the point cloud media from the target encapsulation file.

9. The computer device according to claim 7, wherein the parsing the $i^{th}$ attribute component of the point cloud media from the target encapsulation file comprises:

when the attr_mandatory field indicates that the $i^{th}$ attribute component is a mandatory attribute component, first parsing the $i^{th}$ attribute component of the point cloud media and then parsing non-mandatory attribute components in the point cloud media; and when the attr_mandatory field indicates that the $i^{th}$ attribute component is a non-mandatory attribute component, first parsing mandatory attribute components in the point cloud media and then skipping parsing the $i^{th}$ attribute component.

10. The computer device according to claim 7, wherein the parsing the $i^{th}$ attribute component of the point cloud media from the target encapsulation file comprises:
performing verification on integrity of the point cloud media when the attr_mandatory field indicates that the $i^{th}$ attribute component is a mandatory attribute component; and
when it is determined through the verification that the $i^{th}$ attribute component is missing from the point cloud media, discarding the point cloud media or continuing to parse the remaining mandatory attribute components and non-mandatory attribute components in the point cloud media.

11. The computer device according to claim 7, wherein a smaller value of the attr_priority field indicates a higher priority of the $i^{th}$ attribute component and a lower possibility that the $i^{th}$ attribute component is discarded during transmission, or a larger value of the attr_priority field indicating a higher priority of the $i^{th}$ attribute component and a lower possibility that the $i^{th}$ attribute component is discarded during transmission.

12. The computer device according to claim 7, wherein the $i^{th}$ attribute component cannot be discarded during transmission when the $i^{th}$ attribute component is a mandatory attribute component, and the $i^{th}$ attribute component can be discarded during transmission when the $i^{th}$ attribute component is a non-mandatory attribute component.

13. A non-transitory computer-readable storage medium, comprising computer instructions, the computer instructions being suitable to be loaded by a processor of a computer device and cause the computer device to perform a method for processing point cloud media including:
receiving a media presentation description (MPD) file transmitted by a second computer device, the MPD file comprising at least one piece of description information of point cloud media, the at least one piece of description information comprising target description information used for describing a target encapsulation file of the point cloud media, the point cloud media comprising N attribute components, and the target description information including (i) an attribute priority (attr_priority) field indicating a priority of an $i^{th}$ attribute component and (ii) an attribute mandatory (attr_mandatory) field indicating that whether the $i^{th}$ attribute component is a mandatory attribute component or not, the $i^{th}$ attribute component being any one of the N attribute components and both N and i being positive integers and i∈[1, N];
transmitting an acquisition request to the second computer device in response to a selection operation on the target description information in accordance with (i) a current network condition and (ii) the attr_priority field and the attr_mandatory field of the $i^{th}$ attribute component, wherein the second computer device is configured to package and return the target encapsulation file according to the acquisition request, the target encapsulation file comprising a component information data box of the point cloud media, the component information data box comprising information of the $i^{th}$ attribute component;
receiving the target encapsulation file from the second computer device; and
parsing the $i^{th}$ attribute component of the point cloud media based on the information of the $i^{th}$ attribute component from the target encapsulation file in accordance with (i) the current network condition and (ii) the attr_priority field and the attr_mandatory field of the $i^{th}$ attribute component in the target description information.

14. The non-transitory computer-readable storage medium according to claim 13, wherein a smaller value of the attr_priority field indicates a higher priority of the $i^{th}$ attribute component and a lower possibility that the $i^{th}$ attribute component is discarded during transmission, or a larger value of the attr_priority field indicating a higher priority of the $i^{th}$ attribute component and a lower possibility that the $i^{th}$ attribute component is discarded during transmission.

15. The non-transitory computer-readable storage medium according to claim 13, wherein the point cloud media comprises a plurality of attribute components, and a $j^{th}$ attribute component of the point cloud media is any one of the N attribute components other than the $i^{th}$ attribute component, j being a positive integer and j∈[1, N]; the priority of the $i^{th}$ attribute component is higher than a priority of the $j^{th}$ attribute component; and
the parsing the $i^{th}$ attribute component of the point cloud media from the target encapsulation file comprises:
parsing the $i^{th}$ attribute component of the point cloud media, and skipping the $j^{th}$ attribute component of the point cloud media from the target encapsulation file.

16. The non-transitory computer-readable storage medium according to claim 13, wherein the $i^{th}$ attribute component cannot be discarded during transmission when the $i^{th}$ attribute component is a mandatory attribute component, and the $i^{th}$ attribute component can be discarded during transmission when the $i^{th}$ attribute component is a non-mandatory attribute component.

17. The non-transitory computer-readable storage medium according to claim 13, wherein the parsing the $i^{th}$ attribute component of the point cloud media from the target encapsulation file comprises:
when the attr_mandatory field indicates that the $i^{th}$ attribute component is a mandatory attribute component, first parsing the $i^{th}$ attribute component of the point cloud media and then parsing non-mandatory attribute components in the point cloud media; and
when the attr_mandatory field indicates that the $i^{th}$ attribute component is a non-mandatory attribute component, first parsing mandatory attribute components in the point cloud media and then skipping parsing the $i^{th}$ attribute component.

18. The non-transitory computer-readable storage medium according to claim 13, wherein the parsing the $i^{th}$ attribute component from the target encapsulation file comprises:
performing verification on integrity of the point cloud media when the attr_mandatory field indicates that the $i^{th}$ attribute component is a mandatory attribute component; and
when it is determined through the verification that the $i^{th}$ attribute component is missing from the point cloud media, discarding the point cloud media or continuing to parse the remaining mandatory attribute components and non-mandatory attribute components in the point cloud media.

* * * * *